United States Patent [19]

Powell et al.

[11] 4,313,116
[45] Jan. 26, 1982

[54] HYBRID ADAPTIVE SIDELOBE CANCELING SYSTEM

[75] Inventors: Norman F. Powell, Ilchester; Henry E. Lee, Columbia; Francisco J. Guillen, Ellicott City, all of Md.

[73] Assignee: Westinghouse Electric Corp., Pittsburgh, Pa.

[21] Appl. No.: 116,681

[22] Filed: Jan. 30, 1980

[51] Int. Cl.³ .............................................. H04B 7/00
[52] U.S. Cl. ...................... 343/100 LE; 343/100 CL
[58] Field of Search .................... 343/100 LE, 100 CL

[56] References Cited

U.S. PATENT DOCUMENTS

| | | | |
|---|---|---|---|
| 3,766,559 | 10/1973 | Butcher, Jr. | 343/100 SA |
| 3,860,924 | 1/1975 | Evans | 343/100 LE |
| 3,916,417 | 10/1975 | Wong et al. | 343/100 LE |
| 3,943,511 | 3/1976 | Evans et al. | 343/100 LE |
| 3,964,065 | 6/1976 | Roberts et al. | 343/100 LE |
| 3,982,245 | 9/1976 | Soule, Jr. et al. | 343/100 LE |
| 4,005,426 | 1/1977 | White | 343/100 LE |
| 4,057,802 | 11/1977 | Dollinger | 343/100 LE |
| 4,060,792 | 11/1977 | Van Heyningen | 343/100 LE |
| 4,189,733 | 2/1980 | Malm | 343/100 CL |

*Primary Examiner*—Theodore M. Blum
*Attorney, Agent, or Firm*—J. B. Hinson

[57] ABSTRACT

A system for adjusting the sidelobe response of a main antenna is disclosed. This iterative process results permits the sidelobe canceling in sequential step reduction in interference thereby greatly reducing the time required to respond to changes in the characteristics of the interference. The response of the phased array is adjusted by combining the composite signal from the main antenna with signals from auxiliary channels which have an adjustable phase and amplitude. The desired amplitude and phase of the auxiliary channels is determined using an iterative mathematical process which emphasizes the most recent data. Emphasizing the most recent data permits the system to be used in the scanning mode or to reduce interference from moving sources.

7 Claims, 7 Drawing Figures

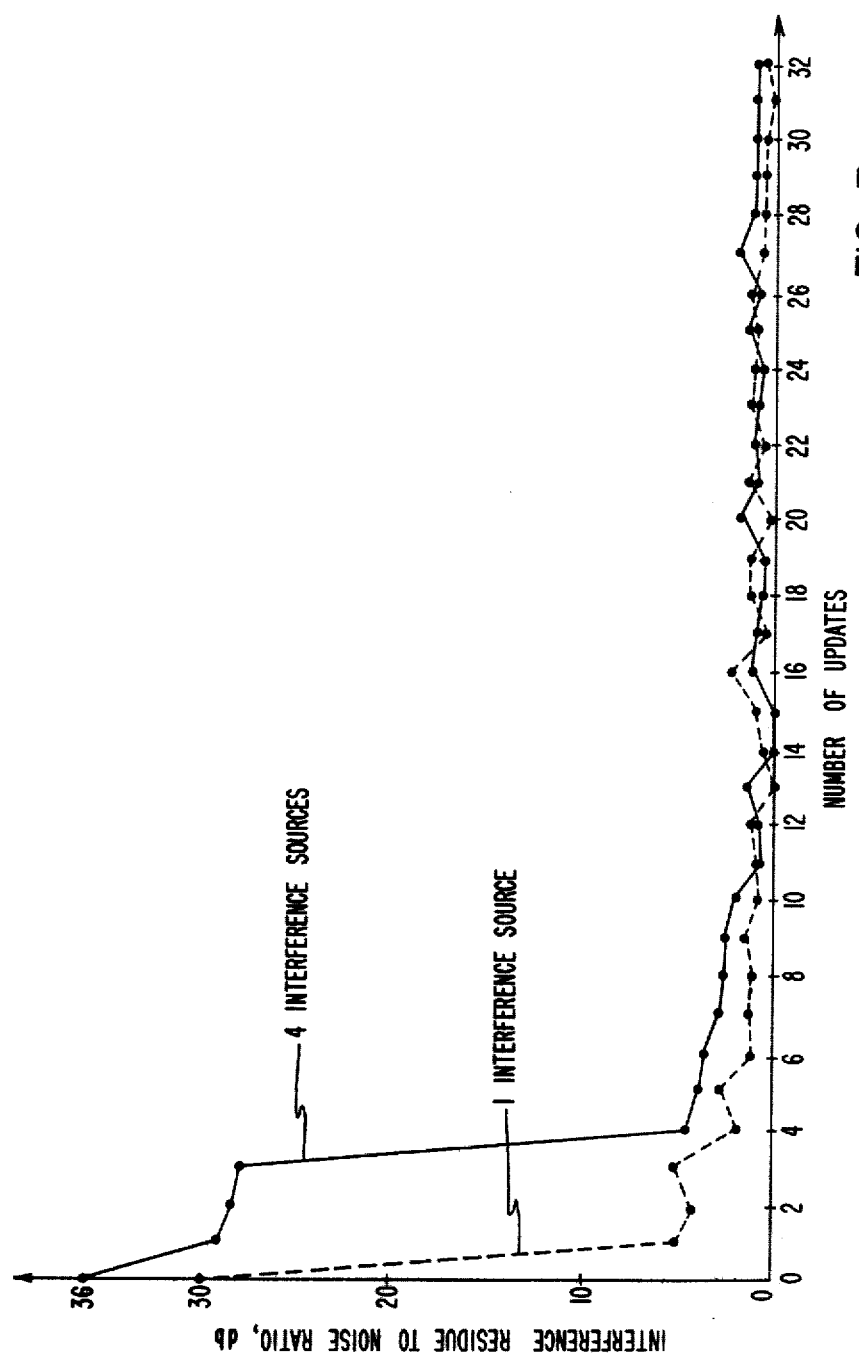

HYBRID ADAPTIVE SIDELOBE CANCELING SYSTEM

BACKGROUND OF THE INVENTION

1. Field of the Invention

The invention relates generally to adaptive sensing systems and more specifically to adaptive sidelobe cancelers utilizing an iterative mathematical process to calculate signals which control phase shift and attenuator circuits to produce RF signals which are combined in an analog summer to modify the sidelobe characteristics of the main antenna to reduce the effect of an interfering signal.

2. Description of the Prior Art

Typical prior art sidelobe canceling systems have utilized either all digital or all analog techniques to correct the final output signal of the system to perform the sidelobe canceling. Additionally, in an all digital system, no correction was made until the mathematical computations necessary to complete the cancellation process had been performed. The time required to complete the mathematical calculations determined the time required for the system to adapt to a particular interference situation. When scanning occurred or when the interfering signal source was moving relative to the antenna, the relative velocity between the major beam pattern and an interference source could significantly reduce the effectiveness of the system.

SUMMARY OF THE INVENTION

The preferred embodiment of the invention comprises an adaptive sidelobe canceling system. The main antenna provides a composite RF signal. A second group of auxiliary signals is produced by either a group of independent sensing elements or by tapping the output signals of a selected number of elements of a phased array antenna in a system utilizing such an antenna. The composite signal is coupled to the input of an analog summing circuit. Similarly, the group of auxiliary signals are also coupled as input signals to the analog summing circuit through amplitude and phase shift means. A digital arithmetic circuit senses the output signal of the summing circuit and the auxiliary signals to produce by an iterative mathematical process signals which control the amplitude and phase shift means.

BRIEF DESCRIPTION OF THE DRAWINGS

FIG. 7 is a diagram illustrating the performance of the disclosed sidelobe canceling system.

DETAILED DESCRIPTION

Figure 1:
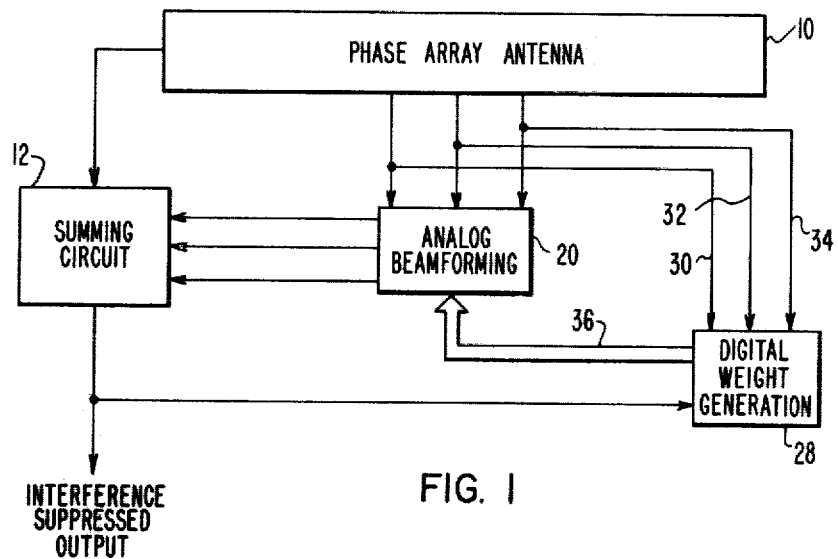
FIG. 1 is a functional block diagram illustrating the invention.

FIG. 1 is a functional block diagram illustrating the invention. Functionally the system automatically changes or adapts the receive sidelobe response pattern of a main antenna 10 to reduce the sensitivity to interference signals which may be in one or more of the sidelobes of the antenna response. In the case of a phased array antenna each element of the antenna 10 produces a distinct output signal. In FIG. 1 only composite output signal and the auxiliary channels which are used for sidelobe response modification are illustrated. For purposes of describing the function of the system the number of elements in the array 10 and the number of auxiliary is not important.

The composite output signal of the antenna 10 is coupled to a summing circuit 12 via an interconnect path 14. Additionally, three auxiliary signals are coupled to an analog beam forming network 20 via interconnect paths 22, 24 and 26 and to a digital weight generation circuit 28 via an interconnect paths 30, 32 and 34. The digital weight generation circuit 28 generates control signals which are inputted to the analog beam forming circuit 20 via interconnect path 36. Analog beam forming network 20 generates a plurality of RF output signals having a predetermined phase and amplitude with respect to the composite signal. These signals are coupled as inputs to the summing circuit 12. The output signal of the summing circuit 12 is a signal in which interference signal appearing in the side bands is suppressed.

Figure 2:
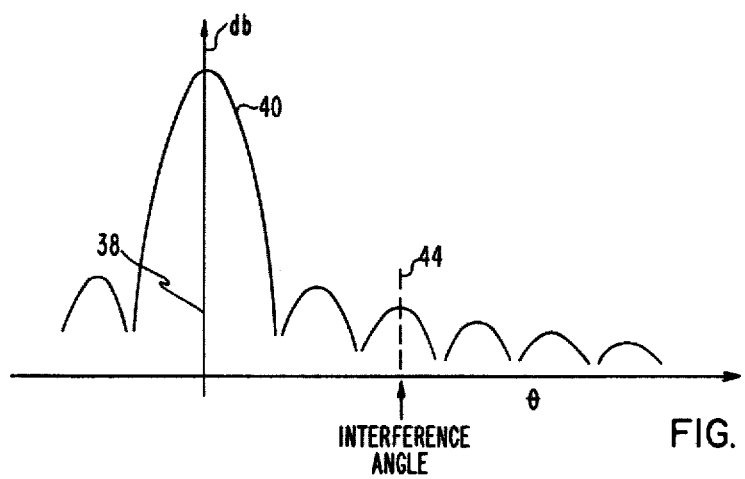
FIG. 2 is a diagram illustrating the angle amplitude response of a typical antenna.

As an aid in describing the invention and how it adapts to reduce the response to an interference signal appearing in one of the sidelobes, the response characteristic of a typical antenna is illustrated in FIG. 2. Typically the response pattern 40 is symmetrical around the major beam axis 38. Additionally there are a series of sidelobes which get progressively smaller as the distance from the center of the main lobe increases. The five major sidelobes of the antenna are illustrated generally as reference numeral 42.

For purposes of describing the invention, it is assumed that an interference signal is positioned such that it is within the second sidelobe or along an axis 44 as illustrated in FIG. 2. The operation of the system will be described to illustrate how the response characteristic of the antenna 40 is modified to reduce the effect of this interference signal.

Figure 3:
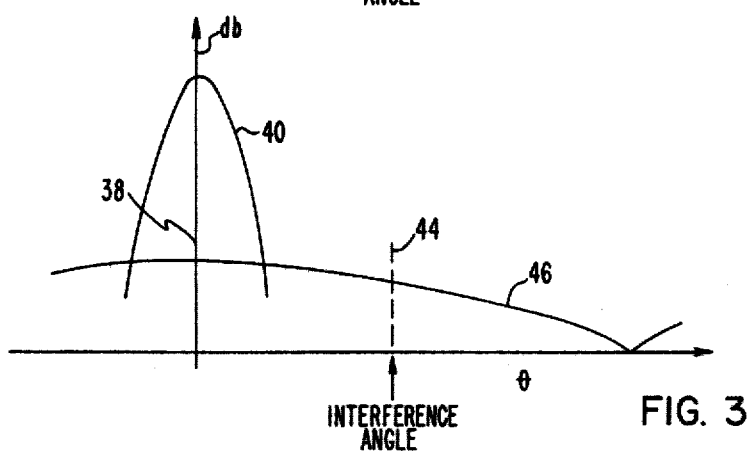
FIG. 3 is a diagram illustrating the main beam and the auxiliary channel response of a typical antenna.

In FIG. 3 the response characteristic of the main beam of the array is illustrated generally at reference numeral 40. Similarly, the response of the auxiliary channels is illustrated at reference numeral 46. This clearly illustrates that the overall gain of the auxiliary channels is considerably lower than the main beam. The auxiliary channels may be provided by suitable apparatus to tap a small signal from a number of elements of the array 10. Alternatively, completely separated wide band antennas such as horns, for example may be used. Separate wide band antennas are particularly useful when the main antenna is not a phased array. This overall gain characteristic of the auxiliary channels is utilized to determine the maximum amplitude and phase adjustments as described below.

Figure 4:
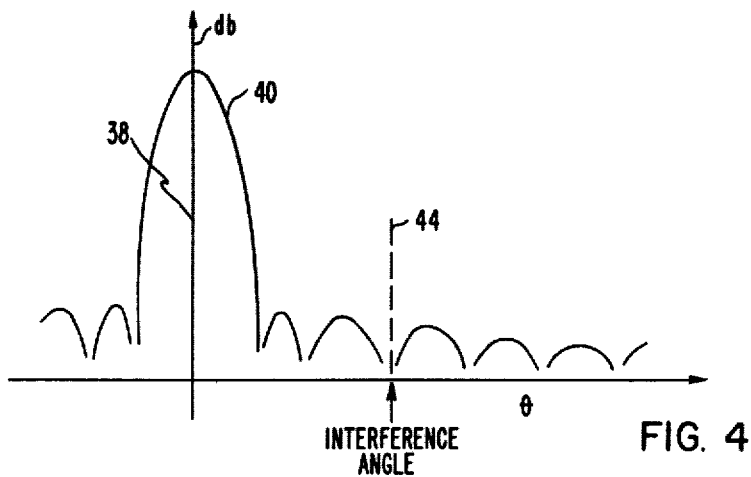
FIG. 4 is a response diagram of a typical system after response modification for interference canceling.

FIG. 4 is the response characteristic of the main antenna 10 after the response characteristic has been adjusted to reduce the gain of the sidelobe along axis 44 to substantially zero. As illustrated in FIG. 4 the response of the main beam 40 is substantially the same as the main beam response in FIG. 2. However, the width of the first sidelobe has been narrowed such that the axis 44 is positioned at the midpoint between the second and third sidelobes resulting in a position at which the response of the array is substantially zero. This permits the response to be adjusted such that it has substantially zero response to any interference signal appearing along axis 44. The response characteristic also adjusted to similarly reduce the response to multiple interference signals.

Figure 5:
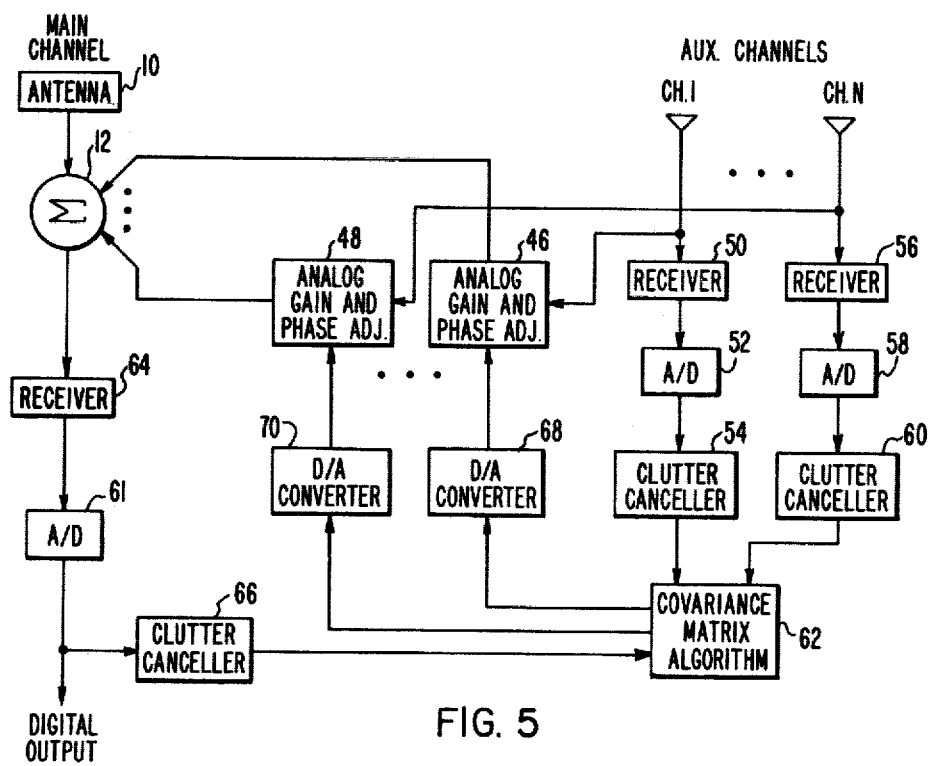
FIG. 5 is a more detailed diagram illustrating the invention.

The operation of the invention will be described in detail with reference to the block diagram of FIG. 5. The composite signal from the main antenna 10 is coupled to the summing unit 12 as previously described. Additionally the auxiliary channel signals 1 through N are coupled to the summer 12 through individual analog gain and phase adjusters with the gain and phase adjuster for the first channel being illustrated at reference numeral 46 and the gain and phase adjuster for the N channel being illustrated at reference numeral 48. As previously discussed, the number of auxiliary channels will depend on the application with the four channels being typical.

The RF signal from the first channel is coupled to a first receiver 50 to generate at the output of this receiver a conventional video signal. This signal is sampled and digitized at a suitable rate by an analog digital converter 52. The digitized video signal from the analog digital converter 52 is coupled as an input signal to a clutter canceler 54 to produce at the output of this circuit a video signal free of clutter. Similarly, the output signal of the Nth channel is coupled to a receiver 56, analog-to-digital converter 58, and clutter filter 60 to produce at the output of the clutter canceler 60 a video signal from channel N. These two clutter canceled signals are coupled as inputs to a covariance matrix algorithm circuit 62.

Similarly, the output signal of the summer circuit 12 is coupled as an input to the principle receiver 64. The output of the receiver 64 is a conventional video signal which is sampled by an analog digital converter 61 to generate at the output of this analog digital converter a series of digital signals representative of the video input signal. This digitized video signal is the output signal of the sidelobe canceler and also the input signal to a third clutter canceling circuit 66. The output signal of the clutter canceler 66 is also coupled the covariance matrix algorithm circuit 62. Covariance matrix algorithm circuit 62 generates a series of digital numbers each specifying the gain and phase of an associated analog and gain phase network. For example, a first output of the covariance and matrix algorithm circuit 62 is a digital number which is coupled to the input of a first analog to digital converter 68 to generate at the output of this circuit an analog signal which adjust the gain and phase of a first analog and gain phase adjust circuit 46 to the desired value. Similarly, the covariance matrix algorithm circuit 62 generates a second output signal which is coupled as an input to analog-to-digital converter 70 to generate an analog signal which sets the phase and gain of phase and of a second network 48 to the desired value.

Figure 6:
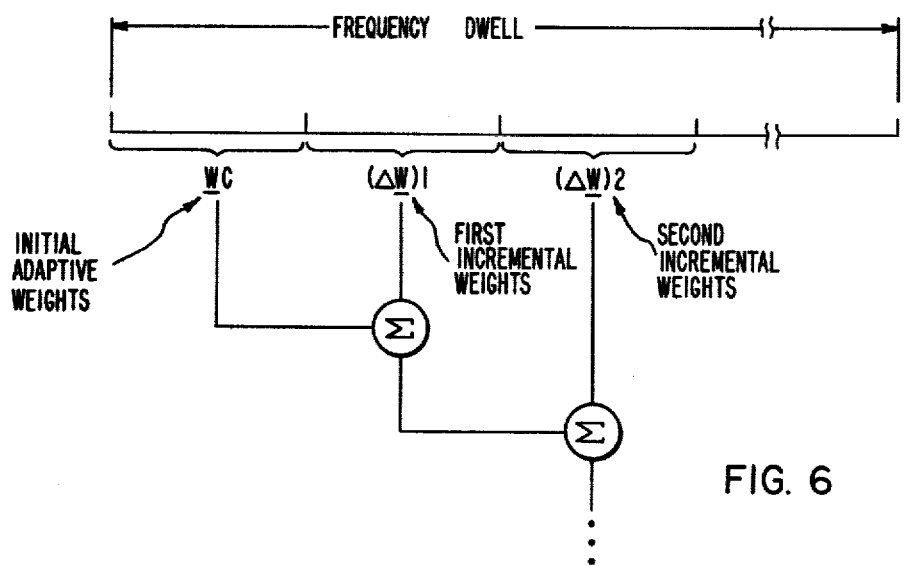
FIG. 6 is a diagram illustrating the iterative process used to update the weighting function.

As previously described the invention utilizes a process for sequentially updating the control signals of the gain and phase circuit such that the interference is reduced in steps. This sequential process is illustrated in FIG. 6. For example, each frequency dwell is divided into a series of update periods. This is illustrated in FIG. 6 where the first update of the weights $\underline{W}C$ occurs at the end of the first update period. Each update period must be sufficiently long to permit at least one sample to be collected from each of the auxiliary channels. Each update period is preferably the same length with the updating process continuing so long as the radar is in operation.

FIG. 7 illustrates the sidelobe cancellation as the number of update cycles for a simulated radar system. From this figure it can be seen that after the third update cycle that the response to four simulated interference sources has been substantially reduced after twelve update cycles the response to these interference sources had been reduced to near background level. This figure also illustrates that the response to a single interference source can be reduced more rapidly. The procedure described above emphasizes the most recent data. This provides the capability of tracking non-stationary interference sources. A computational algorithm based on sequentially inverting the sample covariance matrix is utilized. Let $X_0(n+1)$ and $\underline{X}(n+1)$ denote the $(n+1)$-th samples of the main and the auxiliary channels. $\underline{W}(n)$ is the optimal weight estimate and $\underline{M}^{-1}(n)$ is the inverse of the covariance matrix obtained previously. On the arrival of the $(n+1)$-th time samples the weights are updated to $\underline{W}(n+1)$ and $\underline{M}^{-1}(n)$ th is updated to $\underline{M}^{-1}(n+1)$ based on the following equations:

$$K(n) = \frac{M^{-1}(n) X(n+1)}{X_t(n+1) M^{-1}(n) X(n+1) + \alpha} \quad \alpha \leq 1$$
$$W(n+1) = W(n) + K(n)[X_0(n+1) - X_t(n+1) W(n)]$$
$$M^{-1}(n+1) = \frac{1}{\alpha} \{M^{-1}(n) - K(n) X_t(n+1) M^{-1}(n)\}$$

The above equations are based on the standard covariance matrix algorithm used in sidelobe cancellation radars, modified to permit sequential updating. In the above equations $\alpha$ is the amplitude weighting factor which is employed to weight the significance of data sample, thus enabling the emphasizing of the most recent data. The system can be implemented using commercially available components.

We claim:
1. An adaptive sidelobe canceler comprising:
 (a) an array of sensing elements each producing an output signal in response to a signal impinging upon said sensing elements;
 (b) apparatus for combining said output signals to produce a composite signal;
 (c) means coupled to selected sensing elements of said array to produce a group of second output signals in response to a signal impinging on said sensing elements;
 (d) phase and amplitude control means for coupling each signal comprising said group of second output signals to the input of a summing circuit;
 (e) means for coupling said composite signal to said summing circuit;
 (f) means responsive to said group of second output signals and the output signal of said summer to produce control signals for controlling said phase and amplitude control means, said control signals being sequentially updated based on a modified covariance matrix algorithm to adapt the response by said array to reduce the effect of unwanted signals.

2. An adaptive sidelobe canceler comprising in combination:
 (a) an array of sensing elements forming first sensing means, each element producing an output signal in response to a signal impinging on said sensing elements;

(b) apparatus for combining said output signals to produce a composite signal;
(c) second sensing means for sensing said signal impinging on said first sensing means to produce a plurality of output signals;
(d) phase and amplitude control means for coupling said plurality of output signals to a summing circuit;
(e) means for coupling said composite signal to said summing circuit;
(f) means responsive to said composite signal and to said plurality of output signals to produce control signals which are coupled to said phase and amplitude control means, said control signals being sequentially updated based on a modified covariance matrix algorithm.

3. An adaptive sidelobe canceler in accordance with claim 1 wherein said means responsive to said second group of signals and to the output signal of said summer comprises:
(a) means for sampling and digitizing the output signal of said summer and each signal comprising said second group of signals to produce digital signals;
(b) arithmetic means responsive to said digital number to produce digital signals which specify the amplitude of signals which control said phase and amplitude control means;
(c) digital-to-analog conversion means responsive to said digital signals which specify the amplitude of signals which control said phase and amplitude control means to produce analog control signals; and
(d) means for coupling said analog control signals to said amplitude and phase control means.

4. An adaptive sidelobe canceler in accordance with claim 3 wherein said mathematical means utilizes an iterative process which emphasizes the most recent data thereby permitting said sidelobe canceler to track moving interference sources.

5. An adaptive sidelobe canceling system comprising, in combination:
(a) a main antenna having a predetermined sidelobe characteristic;
(b) a plurality of auxiliary channels each coupled to an independent gain and phase adjuster;
(c) a summer coupled to receive as input signals the output signal of said main antenna and the output signals of said independent gain and phase adjuster;
(d) control means for producing control signals to control said independent gain and phase adjuster to reduce the response of said system to signals positioned within a sidelobe of said main antenna, said control signals being sequentially modified in accordance with a covariance matrix such that each step reduces the amplitude of an interfering signal toward a minimum.

6. An adaptive sidelobe canceling system in accordance with claim 5 wherein said main antenna is a phased array.

7. A sidelobe canceling system in accordance with claim 6 wherein said control means includes:
(a) an independent receiver coupled to receive the RF output signal of each of said auxiliary channels;
(b) an independent analog-to-digital converter to sample the output signals of each of said receiver; and
(c) a digital computer coupled to receive the output signals of said analog-to-digital converter, the output signal of said system and utilize these signals as data to calculate the values of said control signals.

* * * * *